(12) United States Patent
Cencer

(10) Patent No.: US 8,517,646 B2
(45) Date of Patent: Aug. 27, 2013

(54) SYSTEM AND METHOD FOR RESTRAINING A VEHICLE USING STRAPS

(75) Inventor: Robert James Cencer, Tipton, MI (US)

(73) Assignee: Trinity Industries, Inc., Dallas, TX (US)

( * ) Notice: Subject to any disclaimer, the term of this patent is extended or adjusted under 35 U.S.C. 154(b) by 149 days.

(21) Appl. No.: 12/989,123

(22) PCT Filed: Apr. 24, 2009

(86) PCT No.: PCT/US2009/041705
§ 371 (c)(1),
(2), (4) Date: Oct. 22, 2010

(87) PCT Pub. No.: WO2009/132299
PCT Pub. Date: Oct. 29, 2009

(65) Prior Publication Data
US 2011/0038682 A1 Feb. 17, 2011

Related U.S. Application Data

(60) Provisional application No. 61/048,072, filed on Apr. 25, 2008.

(51) Int. Cl.
*B60P 7/08* (2006.01)
(52) U.S. Cl.
USPC .......... 410/20; 410/7; 410/8; 410/12; 410/97; 410/23

(58) Field of Classification Search
USPC ............... 410/97, 100, 7, 8, 9, 10, 11, 12, 19, 410/20, 21, 22, 23, 30, 50; 24/265 CD; 105/355; 248/499
See application file for complete search history.

(56) References Cited

U.S. PATENT DOCUMENTS

| | | | |
|---|---|---|---|
| 1,937,769 A * | 12/1933 | Lute | 410/20 |
| 4,838,743 A | 6/1989 | Blunden et al. | |
| 4,960,353 A * | 10/1990 | Thorndyke | 410/20 |
| 5,108,237 A | 4/1992 | Zankich | |
| 6,171,037 B1 | 1/2001 | Andre | |
| 6,390,680 B1 | 5/2002 | Last | |
| 7,182,569 B2 | 2/2007 | Wrobley et al. | |

OTHER PUBLICATIONS

International Preliminary Report on Patentability; International application No. PCT/US2009/041705; International Filing Date: Apr. 24, 2009, Nov. 4, 2010.

(Continued)

*Primary Examiner* — Stephen Gordon
(74) *Attorney, Agent, or Firm* — Baker Botts L.L.P.

(57) ABSTRACT

A vehicle restraint system includes a strap assembly configured to be positioned on a portion of a tire of a vehicle to secure the vehicle to a configurable track assembly, such that the strap assembly is configured to be coupled to the configurable track assembly on inboard side of the tire of the vehicle. System includes a pin assembly configured to be coupled to the configurable track assembly on outboard side of the tire of the vehicle, such that the pin assembly is operable to receive the strap assembly. System also includes a winch assembly configured to be coupled to the configurable track assembly and to a second end of the strap assembly, such that the winch assembly is uncoupled from the pin assembly and operable to tighten the strap assembly around a portion of the tire.

21 Claims, 10 Drawing Sheets

(56) References Cited

OTHER PUBLICATIONS

International Preliminary Report on Patentability; International application No. PCT/US2009/041695; International Filing Date: Apr. 24, 2009, Nov. 4, 2010.

The First Office Action (PCT application in Chinese national phase) issued by the State Intellectual Property Office of the People's Republic of China; Application No. 200980114581.9; Serial No. 2012051600840950, May 21, 2012.
Chinese Office Action, w/English translation; Application No. 200980114581.9; pp. 11, Jan. 25, 2013.

* cited by examiner

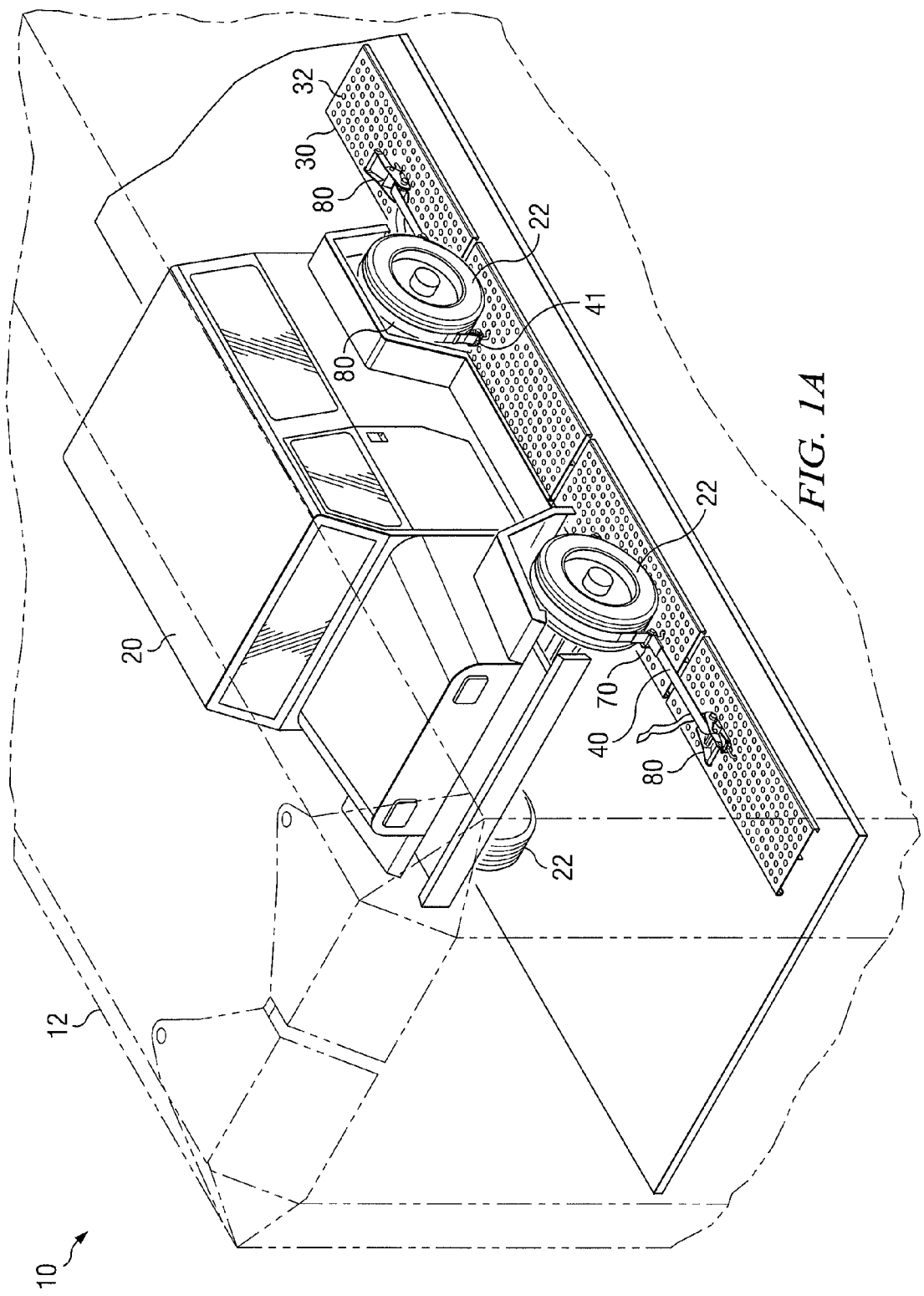

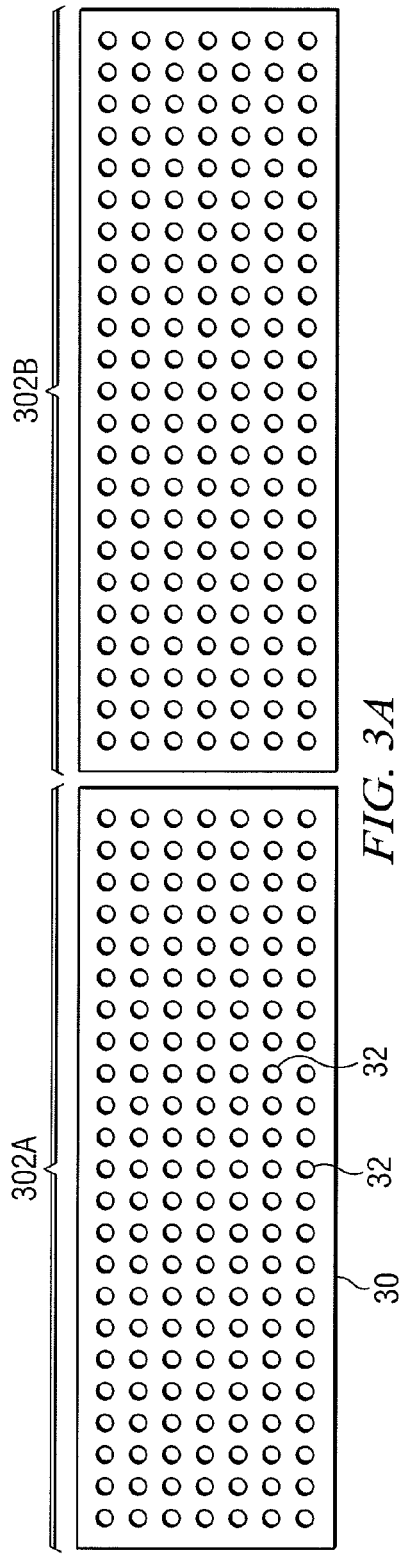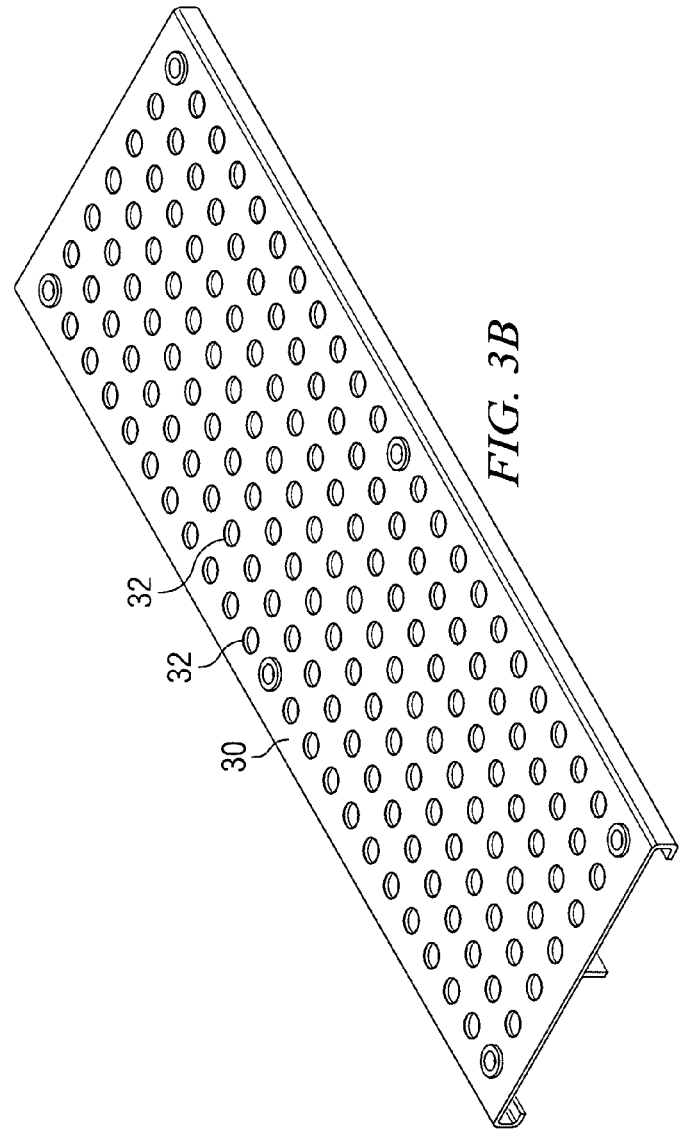

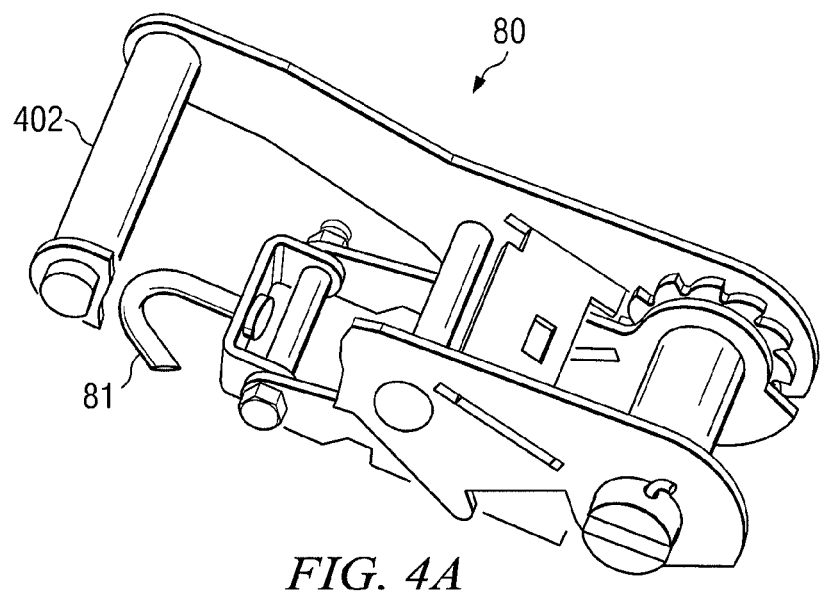
*FIG. 4A*
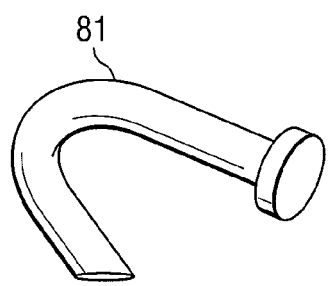
*FIG. 4B*
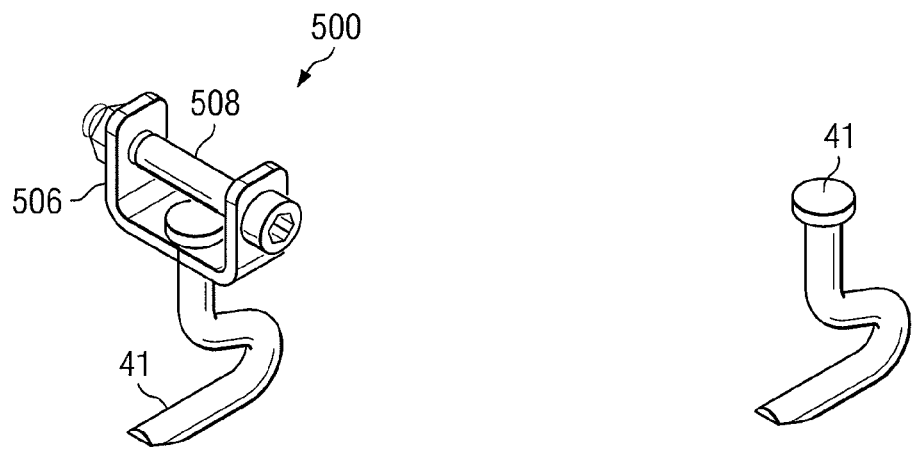
*FIG. 5A*  *FIG. 5B*

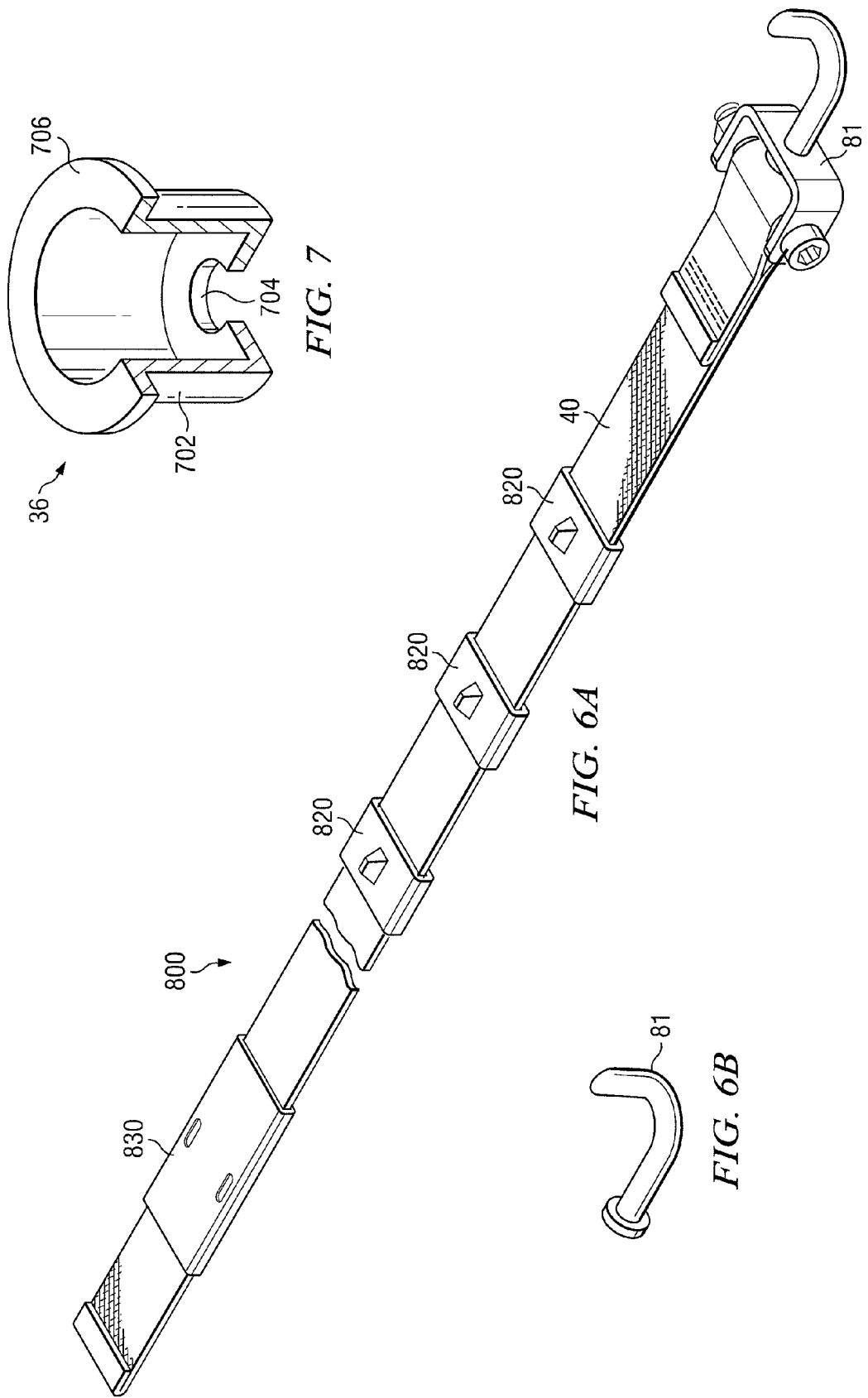

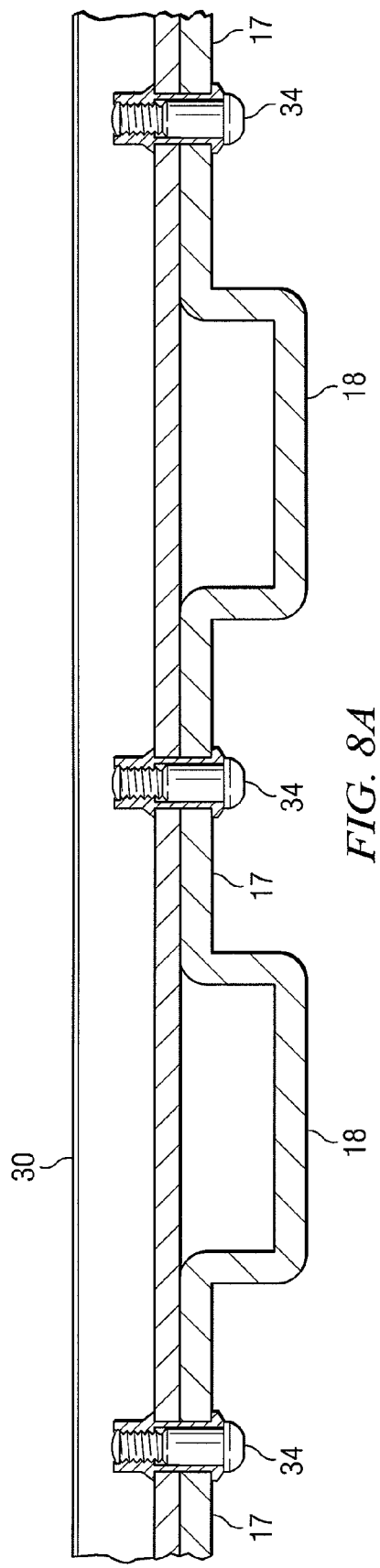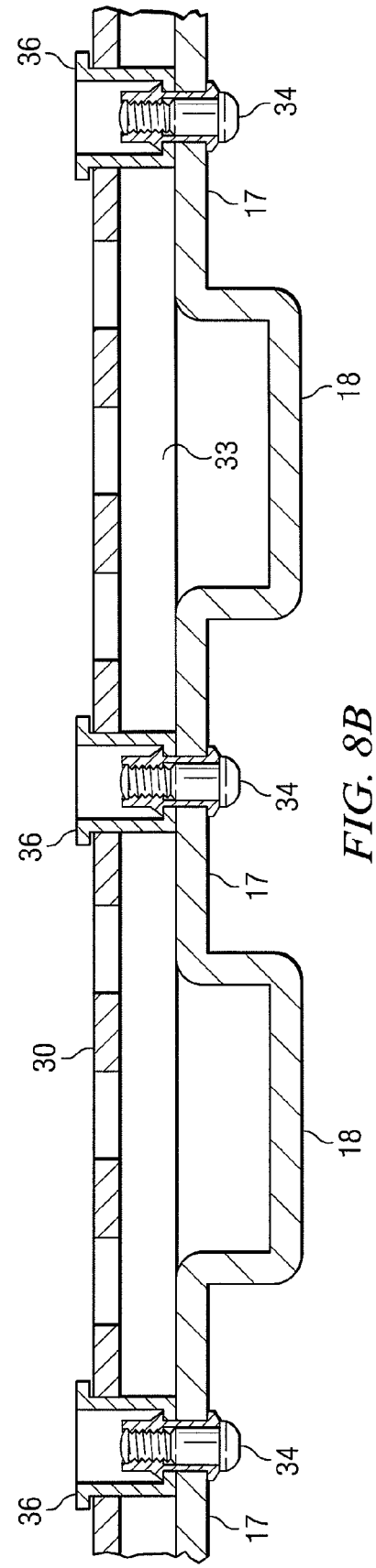

SYSTEM AND METHOD FOR RESTRAINING A VEHICLE USING STRAPS

RELATED APPLICATIONS

This application claims the benefit under 35 U.S.C. §371 of PCT/US2009/041705, entitled "System and Method for Restraining a Vehicle Using Straps," filed Apr. 24, 2009. PCT/US2009/041705 claims the benefit under 35 U.S.C. §119(e) of U.S. Provisional Application No. 61/048,072 filed Apr. 25, 2008, entitled "System and Method for Restraining a Vehicle During Transportation".

TECHNICAL FIELD

The present disclosure relates generally to restraining a vehicle, and more particularly for restraining a vehicle using straps.

BACKGROUND

Wheel chocking devices may be used to secure automobiles, trucks and other vehicles to the bed or floor of a transportation vehicle such as a railroad car. When vehicles are not properly secured during transport, damage to the vehicle, an adjacent vehicle or the railcar may result due to shifting of the vehicle in response to forces encountered by the railcar.

If the railcar transporting the vehicle is subjected to a sudden force, the momentum of the vehicle being transported may cause its suspension to bend and steering to become mis-aligned. In addition, vehicles may collide with each other causing damage to multiple vehicles.

SUMMARY

In accordance with the teachings of the present disclosure, a vehicle restraint system is provided.

In a particular embodiment a vehicle restraint system includes a strap assembly configured to be positioned on a portion of a tire of a vehicle to secure the vehicle to a configurable track assembly, such that the strap assembly is configured to be coupled to the configurable track assembly on inboard side of the tire of the vehicle. System includes a pin assembly configured to be coupled to the configurable track assembly on outboard side of the tire of the vehicle, such that the pin assembly is operable to receive the strap assembly. System also includes a winch assembly configured to be coupled to the configurable track assembly and to a second end of the strap assembly, such that the winch assembly is uncoupled from the pin assembly and operable to tighten the strap assembly around a portion of the tire.

In a more particular embodiment, the system includes the configurable track assembly, such that the configurable track assembly is coupled to a deck having an uneven surface in a railcar. The configurable track assembly may be coupled to a deck of a transport with a plurality of fasteners and fastener cups. The configurable track assembly may be coupled to a deck with a plurality of hinge assemblies. The configurable track assembly includes a plurality of sections coupled to a deck of a transport, such that one of the plurality of sections can be removed and replaced by another section without drilling a hole.

A technical advantage of particular embodiments may include a winch assembly located remotely from pin assembly and outside of an envelope of a vehicle. Thus, there is more clearance in wheel opening and under the body of the vehicle, since the winch assembly is placed outside the envelope of a vehicle rather than inside the envelope of the vehicle. Therefore, the risk of damage to the body of vehicle from the winch assembly is reduced or eliminated. By placing the winch assembly outside the envelope of the vehicle, the need for risers under a vehicle's restrained tires to protect the body of the vehicle from a winch assembly positioned within the envelope of the vehicle is eliminated. As used herein, "envelope" of vehicle refers to a line drawn around the exterior portion of vehicle.

Another technical advantage of particular embodiments may include operating a winch assembly by hand to tighten the strap assembly around one or more portions of a tire of a vehicle, since there is more room to operate the winch assembly placed outside the envelope of the vehicle.

Another technical advantage of particular embodiments may include restraining the vehicle without using chocks. By not using chocks, vehicle restraint system may provide extra clearance between the roof of transport and roof of vehicle, which may decrease the risk of damage from a sudden movement or force by transport. Additionally, vehicle restraint system may be used by distributors of vehicles to validate a particular vehicle to a particular height clearance for all types of transports, since vehicle restraint system may be used in any type of transport.

Another technical advantage of particular embodiments may include providing a configurable track assembly, which is easily installed, moved, and removed so that configurable track assembly may be easily aligned with tires of vehicles having different width between tires. Configurable track assembly may also be configured to be placed on one or more decks of transport that may be corrugated and/or have uneven angularities and heights. Configurable track assembly may also be hinged up to allow cleaning debris, ice, and snow under the configurable track assembly.

Other technical advantages of the disclosed vehicle restraint system may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and features and advantages thereof, reference is now made to the following description, taken in conjunction with the accompanying drawings, in which:

FIG. 1A illustrates a top perspective view of a vehicle restraint system in accordance with a particular embodiment;

FIG. 3A illustrates a top perspective view of a configurable track assembly used in a vehicle restraint system in accordance with a particular embodiment;

FIG. 3B illustrates a side perspective view of a configurable track assembly used in a vehicle restraint system in accordance with a particular embodiment;

FIG. 4A illustrates a perspective view of a winch assembly in a vehicle restraint system in accordance with a particular embodiment;

FIG. 4B illustrates a hook used to couple a winch assembly to a configurable track assembly in accordance with a particular embodiment;

FIG. 5A illustrates a pin assembly in a vehicle restraint system in accordance with a particular embodiment;

FIG. 5B illustrates a hook used to couple a pin assembly to a configurable track assembly in accordance with a particular embodiment;

FIG. 6A illustrates a strap assembly in a vehicle restraint system in accordance with a particular embodiment;

FIG. 6B illustrates a hook used to couple a strap assembly to a configurable track assembly in accordance with a particular embodiment;

FIG. 7 illustrates a cup used in a configurable track assembly used in a vehicle restraint system in accordance with a particular embodiment;

FIG. 8A illustrates fasteners coupled to a deck and configurable track assembly in accordance with a particular embodiment;

FIG. 8B illustrates a configurable track assembly coupled to a deck using fasteners and fastener cups in accordance with a particular embodiment.

DETAILED DESCRIPTION

Figure 1B:
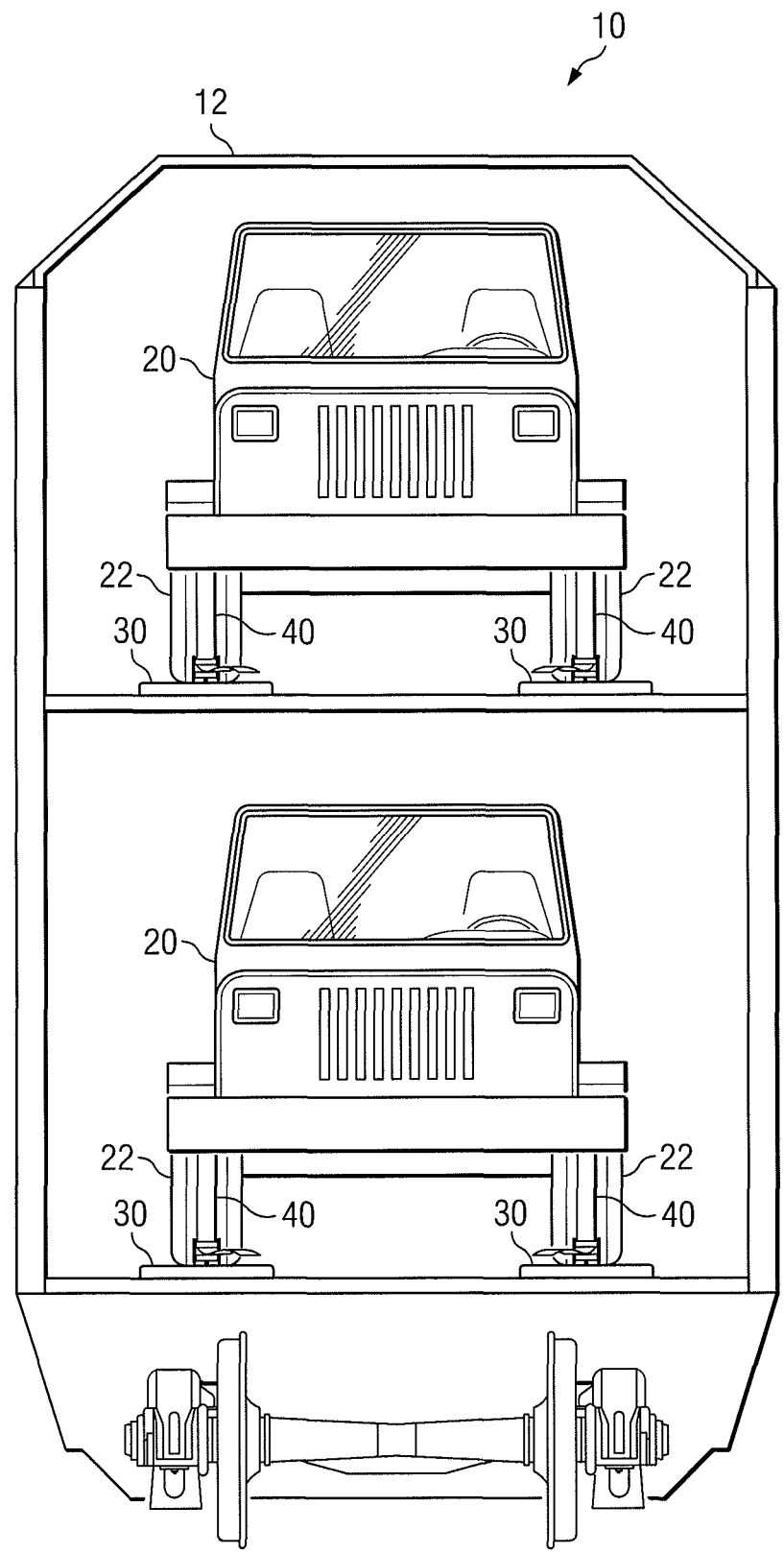
FIG. 1B illustrates a rear perspective view of a vehicle restraint system in accordance with a particular embodiment.

FIG. 1A illustrates a top perspective view of a vehicle restraint system 10 in accordance with a particular embodiment, and FIG. 1B illustrates a rear perspective view of vehicle restraint system 10 in accordance with a particular embodiment. Referring to FIGS. 1A and 1B, vehicle restraint system 10 includes a transport 12 having a configurable track assembly 30 on a deck 16. Configurable track assembly 30 may have a plurality of track holes 32. In the illustrated embodiment, transport 12 may transport one or more vehicles 20 having one or more tires 22 restrained by a strap assembly 40. Strap assembly 40 may be coupled to a convenient track hole 32 on inboard side of tire, coupled to a convenient track hole 32 on outboard side of tire, placed through a pin assembly 70, and placed through a winch assembly 80. Strap assembly 40 may be tightened around one or more portions of tire 22 by winch assembly 80. Strap assembly 40, pin assembly 70, and winch assembly 80 may be coupled to configurable track assembly 30 through one or more track holes 32. As used herein, "outboard" refers to any location outside of a line drawn between the exterior portion of tires 22, such as in front of front tire and in rear of rear tire. As used herein, "inboard" refers to any location on or inside of such line, such as in front of rear tire or in rear of front tire.

Vehicle restraint system 10 is generally designed to prevent damage to vehicle 20 by restraining vehicle 20 using winch assembly 80 to tighten strap assembly 40 coupled to configurable track assembly 30. By not using chocks, vehicle restraint system 10 may provide extra clearance between the roof of transport 12 and roof of vehicle 20, which may decrease the risk of damage from a sudden movement or force caused by transport 12. By placing winch assembly 80 outside the envelope of vehicle 20, the risk of damage to the body of vehicle 20 is further decreased. Placing winch assembly 80 outside the envelope of vehicle 20 also allows winch assembly 80 to be operated by hand, since there is more room to operate winch assembly 80. As used herein, "envelope" of vehicle 20 refers to a line drawn around the exterior portion of vehicle 20. Additionally, vehicle restraint system 10 may be used by distributors of vehicles 20 to validate a particular vehicle 20 to a particular height clearance for all types of transports 12, since vehicle restraint system 10 may be used in any type of transport 12. Prior to vehicle restraint system 10, distributors of vehicles 20 had to validate a particular vehicle 20 numerous times for height clearance when transporting vehicle 20 on different types of transports 12 because each type of transport used a different type of restraining system for transporting vehicles 20.

Vehicle restraint system 10 is also generally designed to use configurable track assembly 30, which is easily installed, moved, and removed so that configurable track assembly 30 may be easily aligned with tires 22 of vehicles 20 having different width between tires 22. Configurable track assembly 30 may also be configured to be placed on one or more decks 16 of transport 12 that may be corrugated and/or have uneven angularities and heights.

Transport 12 may be a railroad car, truck, boat, airplane, or other machine suitable for transporting one or more vehicles 20. In certain embodiments, transport 12 may be a bi-level railroad car having two decks, such that each deck can transport one or more vehicles 20. Vehicle 20 may be an automobile, truck, jeep, or any machine having one or more tires 22. In certain embodiments, vehicle 20 restrained by vehicle restraint system 10 may be a vehicle 20 requiring a certain height clearance, such as a truck or jeep.

Figure 9:
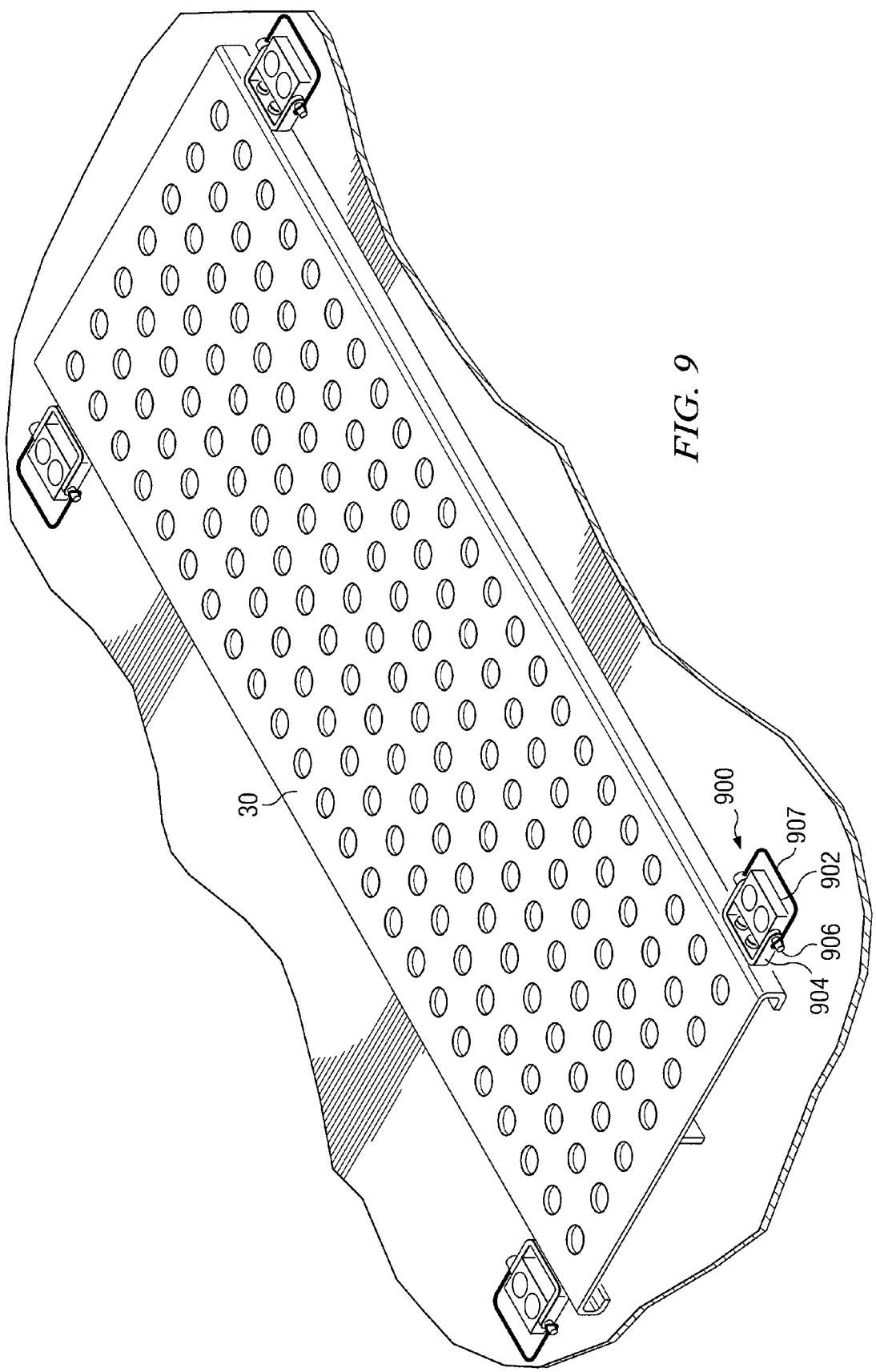
FIG. 9 illustrates a configurable track assembly coupled to a deck by hinge assemblies.

Configurable track assembly 30 may be coupled to one or more decks 16 of transport 12 with fasteners, as illustrated in FIGS. 8A, 8B, and 9. Configurable track assembly 30 may comprise track holes 32 that may be used to couple configurable track assembly 30 to one or more elements of vehicle restraint system 10, including strap assembly 40, pin assembly 70, and winch assembly 80. In certain embodiments, configurable track assembly 30 may be easily installed, moved, and removed so that configurable track assembly 30 may be easily aligned with tires 22 of vehicles 20 having different width between tires 22. Tires 22 may rest on top of configurable track assembly 30 when restraining vehicle 20 in vehicle restraint system 10. In certain embodiments, track holes in configurable track assembly 30 are raised up for traction.

In certain embodiments, configurable track assembly 30 may be seven-eighth's of an inch high, such that hooks used in vehicle restraint system 10 may require a design of certain chamfers and lengths in order to insert into the low clearance area between deck 16 of transport 12 and the bottom side of configurable track assembly 30.

In certain embodiments, configurable track assembly 30 may be coated with a material or polymer to increase the friction of configurable track assembly 30, which allows tire 22 and vehicle 20 to be restrained better. In certain embodiments, such coating may be made of a black polyurethane material, such as Rhino® Tuff Coat with aggregate added. This coating material may also provide sure footing for people loading and unloading vehicle 20 or other materials to and from transport 12. This coating material may also increase the grip of configurable track assembly 30, such that configurable track assembly 30 is not as slippery when wet.

Figure 2A:
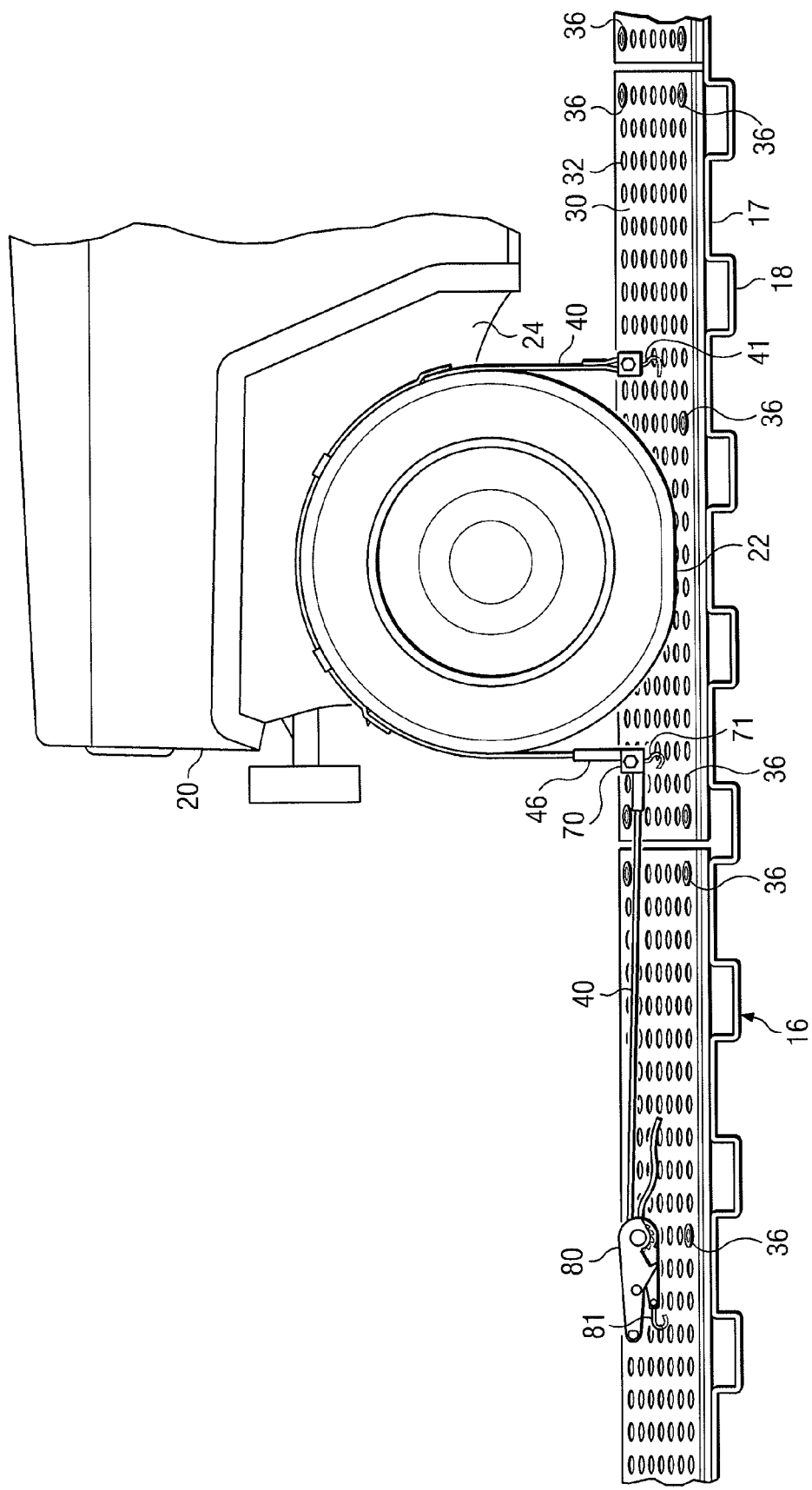
FIG. 2A illustrates a close-up side perspective view of a vehicle restraint system in accordance with a particular embodiment.

Configurable track assembly 30 may also be configured to be coupled to deck 16 of transport by fasteners 12 even if deck 16 is corrugated and/or has uneven angularities and heights, as illustrated in FIGS. 2A, 8A, and 8B. In certain embodiments, configurable track assembly 30 may be coupled to deck 16 by one or more fasteners, such as hucks, and one or more fastener cups, such as huck cups, as illustrated in FIGS. 2A and 8B. In certain embodiments, one or more fasteners are attached to deck 16, as illustrated in FIGS. 2A and 8A. In certain embodiments, one or more fasteners may be attached to deck 16 using a Huck® BOM fastener. In certain embodiments, one or more fasteners may be attached to deck 16 using grade 8¼-20 bolts and nuts. One or more fasteners may be attached to deck 16, such that one or more fasteners are aligned with one or more track holes 32 of configurable track assembly 30. In certain embodiments, fasteners are located in the recessed area of configurable track assembly 30, such that fasteners do not protrude from the surface of configurable track assembly 30 and cannot puncture tire 22 of vehicle 20.

In certain embodiments, each section of configurable track assembly 30 may be fifty-five inches long. In certain embodiments, each section of configurable track assembly 30 may have seven track holes 32 across to allow other elements to be conveniently coupled to configurable track assembly 30. Numerous fasteners and fastener cups may be used to couple each section of configurable track assembly 30 to deck 16. In certain embodiments, six fastener cups may be inserted over six fasteners to fasten configurable track assembly 30 to deck 16, such that a fastener cup is placed in track holes 32 of each corner on the outer rows of configurable track assembly and in track holes 32 in middle of outer rows of configurable track assembly 30, as illustrated in FIG. 2A. The flexibility of where fasteners and fastener cups are placed allow configurable track assembly 30 to be placed in numerous positions on deck 16. In certain embodiments, fasteners and fastener cups may be positioned on the raised portions on a corrugated deck 16, such as the second level deck in a railcar, and positioned away from the superstructure of transport 12 underneath deck 16, such as a railcar superstructure below the first level deck in a railcar.

Each section of configurable track assembly 30 may be cut down in length and/or coped for installation around an area in transport 12, such as a hinged bridge kit at the end of a railcar. Sections of configurable track assembly 30 may have a nominal gap between their ends for water and debris management, such that debris can be blown out from underneath configurable track assembly 30. In certain embodiments, the gap between sections of configurable track assembly 30 may be one-half of an inch. Sections of configurable track assembly 30 do not have to be aligned to each other. In certain embodiments, sections of configurable track assembly 30 may be ramped downward to prevent damage to tires 22 of vehicle 20.

The diameter of the body of a fastener cup may be smaller than track hole 32, such that the clearance between the outside of the diameter of the fastener cup and the track hole may allow for extra tolerance for the location of the fasteners drilled into deck 16. In certain embodiments, fastener cup may be smaller than track hole 32 by one-eighth of an inch in diameter. As illustrated in FIG. 7, fastener cup has a hole in the center of one end, which allows fastener to pass through the hole and be secured by fastener cup. In certain embodiments, fastener cup may have a counter bore, which allows the nose of a fastener gun, such as a Huck® gun, to fit into fastener cup. In certain embodiments, fastener cup may have a rim that is nominally wider than the diameter of track hole 32, such that fastener cup may be anchored in track hole 32. In certain embodiments, fastener cup may allow the fastener head to be recessed, such that tires 22 cannot be punctured by fastener. In certain embodiments, fastener cup may be made of steel.

The height of the fastener cup may be nominally taller than height of configurable track assembly 30, such that the extra height of the fastener cup may allow for configurable track assembly 30 to be twisted or warped. Thus, configurable track assembly 30 may be substantially floating with the fastener cups, which limits the movement of configurable track assembly. The difference in height between fastener cup and configurable track assembly 30 allows configurable track assembly 30 to be coupled to deck 16 of transport 12 by fasteners even if deck 16 is corrugated and/or has uneven angularities and heights, as illustrated in FIGS. 2A, 8A, and 8B. This difference in height may allow for configurable track assembly 30 to move up or down at least by this height difference and up to the height of fastener cup for configurable track assembly 30 to stay coupled to deck 16 even if deck 16 has an uneven surface at different locations below configurable track assembly 30. In certain embodiments, fastener cup may be taller than configurable track assembly 32 by one-eighth of an inch. In certain embodiments, fastener cups may be painted with a reflective paint, such as reflective white paint, to help guide vehicles 20 onto configurable track assembly 30 for loading and unloading during the night or dimly lit environments.

In certain embodiments, individual sections of configurable track assembly 30 are not required to be match drilled to deck 16 in vehicle restraint system 10. As used herein, "match drilling" refers to the process of individually installing one item at a time without pre-drilling holes, such that the item mounted to deck is used as the guide for the drill to locate the holes in deck, which results in poor tolerance. In certain environments, vehicle 20 being restrained may be washed and/or blasted with paint. If item, such as configurable track assembly 30, is drilled into deck 16 before being washed and/or blasted with paint, the metal turnings from deck 16 may get on vehicle 20. Thus, after installation of item, such as configurable track assembly 30, to deck 16, the item must be removed to clean out the metal turnings, and then the item must be reinstalled to the same holes or fasteners as before. Thus, match drilling requires each item to be marked when removed, since each item is unique and must be replaced in the same spot as before since each individual item was used as a guide to drill holes in deck 16. In vehicle restraint system 10, sections of configurable track assembly 30 do not need to be marked when removed, since each section of configurable track assembly 30 can be substituted with another section of configurable track assembly 30, since fastener cups and fasteners may have a high tolerance to be positioned to track holes 32. Match drilling requires new drilling to replace a section of track, but in certain embodiments of vehicle restraint system 10, a section of configurable track assembly 30 may be replaced with a different section, such that no new drilling is required.

In certain embodiments, vehicle restraint system 10 may include sections of configurable track assembly 30, which may be coupled to deck 16 with one or more hinge assemblies, as illustrated in FIG. 9. Policy or regulations regarding a type of transport 12 may require cleaning transport 12. In certain environments, the interior of transport 12 may be exposed to debris, such as ice, snow, and dirt. In certain environments, policy of railroad may require cleaning the first twelve feet of railcar for debris, such as ice, snow, and dirt. Thus, hinge assemblies may be operable to unhinge a section of configurable track assembly 30 to clean debris from underneath that section of configurable track assembly 30. In certain embodiments, vehicle restraint system 10 may include sections of configurable track assemblies 30 coupled to deck 16 by hinge assemblies for the first twelve feet of railcar from the end doors of transport 12, and sections of configurable track assemblies 30 coupled to deck 16 by fastener cups to the remaining length of deck 16 of railcar.

One or more hinge assemblies may be coupled to a section of configurable track assembly 30. In certain embodiments, four hinge assemblies may be coupled to a section of configurable track assembly, such that each hinge assembly is located on the siding of configurable track assembly 30 near each corner, as illustrated in FIG. 9. In certain embodiments, six hinge assemblies may be coupled to a section of configurable track assembly 30, such that three hinge assemblies may be coupled to each side of configurable track assembly. Each hinge assembly may include hinge pins that may be unpinned. In certain embodiments, hinge pins may be removable from hinge assembly. If all hinge assemblies coupled to one side of a section of configurable track assembly 30 are unpinned, then this section of configurable track assembly 30 may be hinged towards the opposite side of the unpinned hinge assemblies, such that the recess under the section of configurable track assembly 30 is exposed and may be cleaned of debris. If all hinge assembles coupled to both sides of a section of configurable track assembly 30 are unpinned, then this section of configurable track assembly 30 may be easily removed and another section of configurable track assembly 30 may be easily substituted.

When all hinge assemblies coupled to a section of configurable track assembly 30, this section of configurable track assembly 30 is secured because of hinge assemblies coupled to section. Hinge assembly bears the stress of fore or aft and side to side loads, such that stress is not placed on hinge pin. Hinge pin may only bear stress from up or down loads or when section of configurable track assembly 30 is hinged up. Hinge pin holes may be oversized for purposes of alignment with another hinge assembly and deck 16.

In certain embodiments, hinge assembly may be installed so that fastener is also recessed under the body of the hinge assembly so that tire 22 will not be punctured by fastener. In certain embodiments, hinge assembly may be welded or cast into the side section of configurable track assembly 30. In certain embodiments, hinge assembly may be attached to the side section of configurable track assembly 30 with a fastener, such that a Huck® BOM fastener may be used.

In certain embodiments, vehicle restraint system 10 may include configurable track assemblies 30 coupled to deck 16 exclusively by fasteners and fastener cups. In certain embodiments, vehicle restraint system 10 may include configurable track assemblies 30 coupled to deck exclusively by hinge assemblies. In certain embodiments, vehicle restraint system 10 may include certain sections of configurable track assemblies 30 coupled to deck 16 by fasteners and fastener cups and certain other sections of configurable track assemblies 30 coupled to deck 16 by hinge assemblies.

Figure 2B:
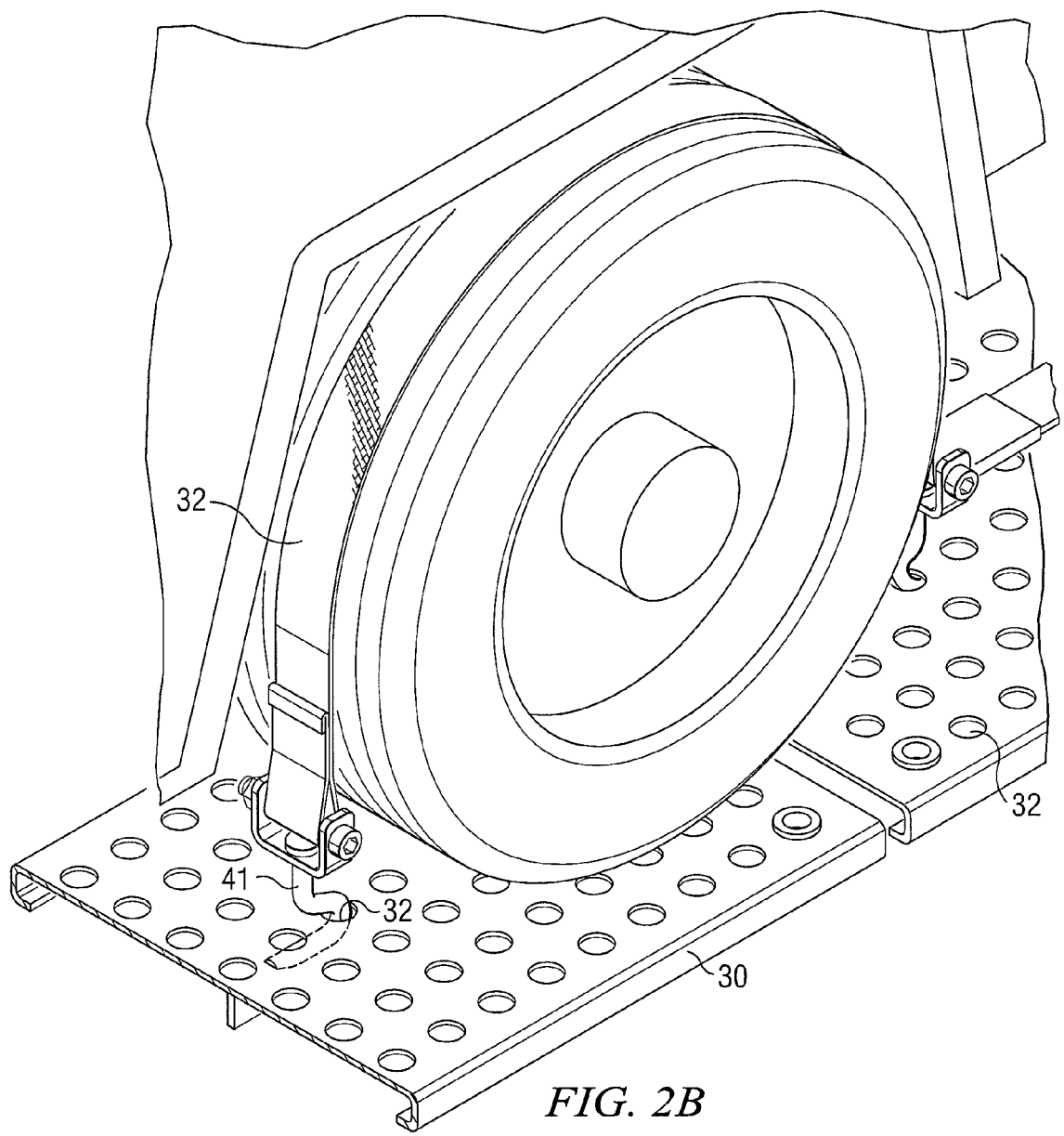
FIG. 2B illustrates a close-up inboard perspective view of a vehicle restraint system in accordance with a particular embodiment.
Figure 2C:
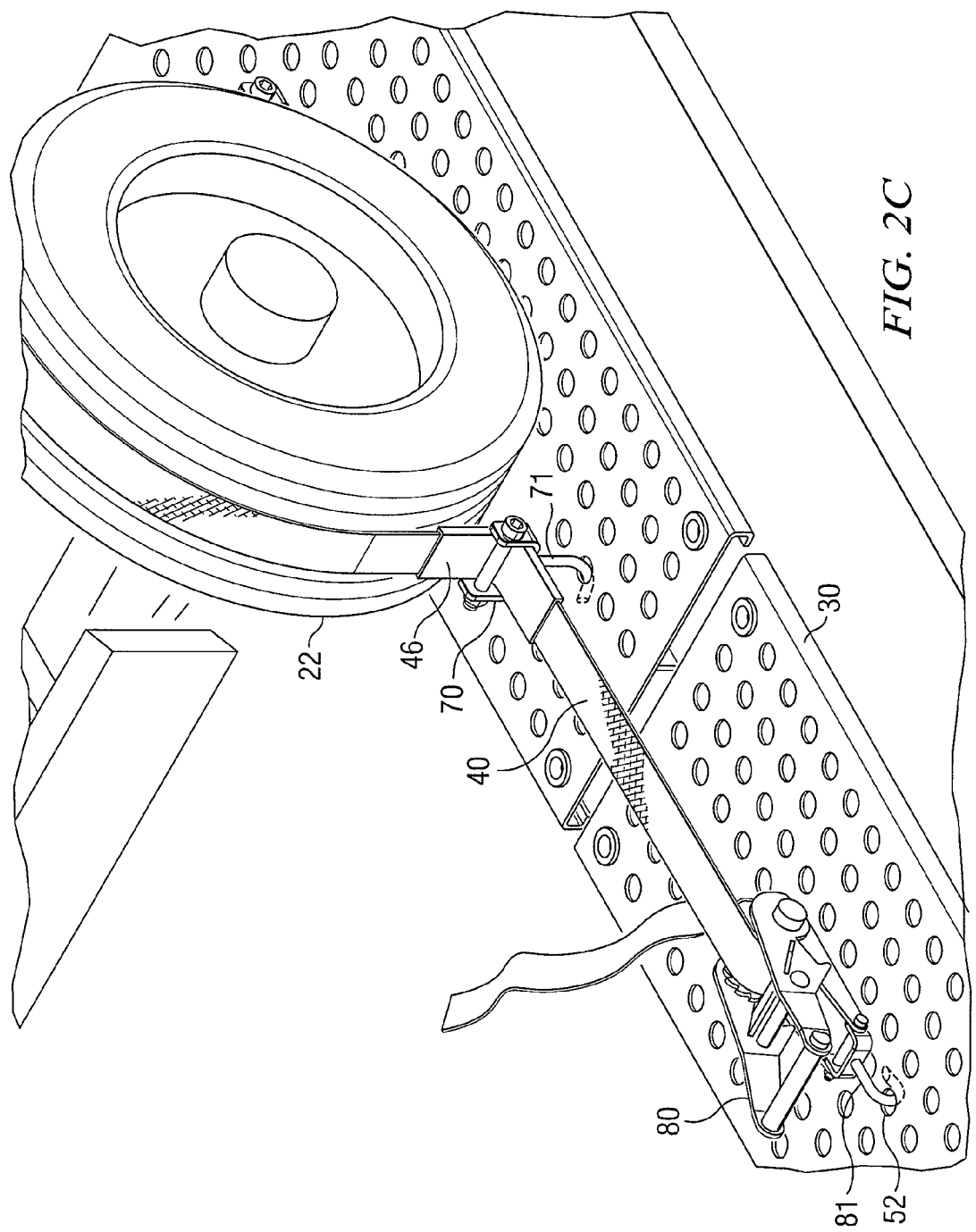
FIG. 2C illustrates a close-up outboard perspective view of a vehicle restraint system in accordance with a particular embodiment.

Strap assembly 40 may include a hook coupled on one end of the strap, as illustrated in FIGS. 6A and 6b. Hook may be coupled to strap assembly 40 to a convenient track hole 32 on inboard side of tire 22, as illustrated in FIGS. 2A and 2B. Strap assembly 40 may also include cleats made of rubber or other suitable material mounted on the strap, such that the cleats may provide a mechanical interlock between tire 22 and strap assembly 40. The strap may be made from flexible synthetic material with the appropriate Safe Working Load Limits. The size of the strap may have compatible dimensions with winch assembly 80. In certain embodiments, the strap may be two inches wide. The normal forces on tire 22 from strap assembly 40 and configurable track assembly 30 may increase the friction between them to prevent tire 22 from rotating. The polymer or coating on configurable track assembly 30 also increases the friction of tire 22 being restrained. Strap assembly 40 may also mechanically prevent tire 22 from moving fore or aft, up or down, and side to side. In certain embodiments, strap assembly 40 restrains tire 22 similar to a band brake, which may be placed around a spinning drum, such that when the band is tightened, the friction of the band stops the drum. In vehicle restraint system 10, by tightening the strap assembly 40 around tire 22, friction may prevent tire 22 from rolling or slipping underneath strap assembly 40. Strap assembly 40 may be coupled to pin assembly 70, as illustrated in FIGS. 2A and 2C, such that a hook coupled to pin assembly 70 may be coupled to a convenient track hole 32 on outboard side of tire 22. By only using strap assembly 40 to restrain tire 22, vehicle restraint system 10 requires less clearance between the roof of transport and the roof of vehicle 20, since strap assembly 40 lessens the bounce of tire 22, such that extra roof clearance is not required to allow vehicle 20 to roll over or "jump" the chocks without the roof of vehicle 20 contacting the roof of transport 12. Thus, vehicle restraint system 10 reduces the risk of damage to body of vehicle 20 since more clearance is provided. Also, vehicle restraint system 10 allows operator of transport 12 to transport taller vehicles 20 in smaller clearance heights. In certain embodiments, vehicle restraint system 10, which does not use chocks, may lower roof clearance requirements to three inches.

Pin assembly 70 may be coupled or movably coupled to strap assembly 40, such that a clevis in pin assembly 70 receives the strap assembly 40. Pin assembly 70 may include an idler pin, clevis, and hook, as illustrated in FIGS. 5A and 5B. Clevis and idler pin may be made out of steel or any other suitable material. Strap assembly 40 may be threaded through pin assembly 80, such that the idler pin is operable to rotate freely, similar to a pulley, for transmitting the force to winch assembly 80 when strap assembly 40 is tightened. Pin assembly 70 may be coupled to a convenient track hole 32 on outboard side of tire 22 by a pin assembly hook 71. In certain embodiments, pin assembly hook may be shaped like a "J".

Winch assembly 80 is coupled to configurable track assembly 30 at a location remote from pin assembly 70. Winch assembly 80 may be coupled to a convenient track hole 32 in numerous ways. In certain embodiments, winch assembly 80 may be coupled to track hole 32 by a hook 81, which is coupled to winch assembly 80. In certain embodiments, winch assembly 80 may be coupled to track hole 32 by a hook 81 sewn to a short strap, which is coupled to winch assembly 80. Hooks used in system 10 may be made from steel wire or forgings or castings of suitable strength and size. In certain embodiments, winch assembly 80 may be attached to track hole 32 at a convenient point away from tire 22 and body of vehicle 20 either in front of front bumper or rear of rear bumper, such that winch assembly 80 is attached outside of the envelope of vehicle 20. Thus, the risk of damage caused to body of vehicle 22, especially a vehicle with a lower profile, by a sudden movement or force by transport 12 is reduced since winch assembly 80 is located outside the envelope of vehicle 20. By placing winch assemblies 80 outside the envelope of vehicle 20, the need for placing risers under vehicles 20 with inadequate clearances is eliminated.

Winch assembly 80 may be a standard hand ratchet winch and may be made from steel or aluminum, as illustrated in FIG. 4A. In certain embodiments, winch assembly 80 may have the ratchet pawls reversed so that a downward force is used to tighten strap assembly 40. Winch assembly 80 is operable to tighten strap assembly 40, such that tires 22 of vehicle 20 are restrained properly to reduce the risk of movement of vehicle 20 from a sudden movement or force. By placing winch assembly 80 outside of envelope of vehicle 22, winch assembly 80 may be more convenient to use since it is not in a tight space under the body of vehicle 20. Thus, winch assemblies 80 may be hand operated, which may be more convenient for tightening strap assemblies 40 to restrain tires 22 of vehicle 20. In certain embodiments, winch assemblies 80 may be operated with a wrench to restrain tires 22 of vehicle 20.

FIG. 2A illustrates a close-up side perspective view of vehicle restraint system 10 in accordance with a particular embodiment, FIG. 2B illustrates a close-up inboard perspective view of vehicle restraint system 10 in accordance with a particular embodiment, and FIG. 2C illustrates a close-up outboard perspective view of vehicle restraint system 10 in accordance with a particular embodiment. Referring to FIGS. 2A, 2B, and 2C, tire 22 of vehicle 20 is restrained by vehicle restraint system 10 by strap assembly 40. Strap assembly is coupled to configurable track assembly 30, such that a hook 41 may couple to a convenient track hole 32 on inboard side of tire 22, as illustrated in FIGS. 6A and 6B, in certain embodiments. Strap assembly 40 coupled to track hole 32 on inboard side of tire 22 may be substantially perpendicular to deck 16. Strap assembly 40 may then be located on center of tire 22 around a portion of the circumference of tire 22. Strap assembly 40 may then be threaded through pin assembly 70 and pin assembly 70 may include a hook 71 couples to a convenient track hole 32 on outboard side of tire 22, such that strap assembly 40 may be substantially perpendicular to deck 16. In certain embodiments, pin assembly hook 71 may be shaped like an "L". Then, strap assembly 40 may be threaded through winch assembly 80.

In certain embodiments, strap assembly 40 may be placed through sleeve 46, which may prevent abrasion of strap assembly 40 against pin assembly 70. Thus, sleeve 46 may protect strap assembly 40 from fraying or breaking when tightened against pin assembly 70.

As mentioned, pin assembly 70 may be movably coupled to strap assembly 40, such that strap assembly may be placed through a clevis of pin assembly 70. Winch assembly 80 may be coupled to track hole 32 in numerous ways, such as using a hook 81 coupled to winch assembly 80 to couple to track hole 32 in certain embodiments. In certain embodiments, hook 71 for pin assembly 70 and hook for winch assembly 80 may be in a "J" shape. In certain embodiments, hook 41 for strap assembly 40 may be in an "L" shape.

As mentioned, winch assembly 80 is operable to tighten strap assembly 40, such that tires 22 of vehicle 20 are restrained properly to reduce the risk of movement of vehicle 20 from a sudden movement or force. By placing winch assembly 80 outside of envelope of vehicle 22, winch assembly 80 may be more convenient to use since it is not in a tight space under the body of vehicle 20. As shown, the clearance between wheel well 24 and pin assembly 70 is increased by placing winch assembly 80 remote from pin assembly 70 rather than coupling winch assembly 80 to pin assembly 70.

Tires 22 may be on top of configurable track assembly 30 when restraining vehicle 20 in vehicle restraint system 10. In certain embodiments, configurable track assembly 30 may be an inch or lower in height, such that hooks used in vehicle restraint system 10 may require a design of certain chamfers and lengths in order to insert into the low clearance area between deck 16 of transport 12 and the bottom side of configurable track assembly 30.

As mentioned, configurable track assembly 30 may also be configured to be coupled to deck 16 of transport 12 by fasteners 34 even if a deck 16 is corrugated with raised portions of deck 17 and depressed portions of deck 18. In certain embodiments, configurable track assembly 30 may be coupled to deck 16 by one or more fasteners 34, such as hucks, and one or more fastener cups 36, such as huck cups. In certain embodiments, one or more fasteners 34 are attached to deck 16. In certain embodiments, one or more fasteners 34 may be attached to deck using a very strong Huck® BOM fastener. In certain embodiments, one or more fasteners 34 may be attached to deck 16 using grade 8¼-20 bolts and nuts. One or more fasteners 34 may be attached to deck 16, such that one or more fasteners 34 are aligned with one or more track holes 32 of configurable track assembly 30. In certain embodiments, fasteners 34 are located in the recessed area of configurable track assembly 30, such that fasteners 34 do not protrude from the surface of configurable track assembly 30 and cannot puncture tire 22 of vehicle 20.

As mentioned, the flexibility of where fasteners 34 and fastener cups 36 are placed allow configurable track assembly 30 to be placed in numerous positions on deck 16. In certain embodiments, fasteners 34 and fastener cups 36 may be positioned on raised portions 17 on a corrugated deck 16, such as the second level deck in a railcar, and positioned away from the superstructure of transport 12 underneath deck 16, such as a railcar superstructure below the first level deck in a railcar. Sections of configurable track assembly 30 may have a nominal gap between their ends for water and debris management, such that debris can be blown out from underneath configurable track assembly 30. In certain embodiments, the gap between sections of configurable track assembly 30 may be one-half of an inch. Sections of configurable track assembly 30 do not have to be aligned to each other. In certain embodiments, sections of configurable track assembly 30 may be ramped downward to prevent damage to tires 22 of vehicle 20.

As mentioned, the diameter of the body of fastener cup 36 may be smaller than track hole 32, such that the clearance between the outside of the diameter of the fastener cup 36 and the track hole 32 may allow for extra tolerance for the location of the fasteners 34 drilled into deck 16. In certain embodiments, fastener cup 36 may be smaller than track hole 32 by one-eighth of an inch in diameter. Fastener cup 36 has a hole in center of one end, which allows fastener 34 to pass through the hole and be secured by fastener cup 36. In certain embodiments, fastener cup 36 may have a counter bore, which allows the nose of a fastener gun, such as a Huck® gun, to fit into fastener cup. In certain embodiments, fastener cup may have a rim that is nominally wider than the diameter of track hole 32, such that fastener cup may be positioned in track hole 32. In certain embodiments, fastener cups 36 may be painted with a reflective paint, such as reflective white paint, to help guide vehicles 20 onto configurable track assembly 30 for loading and unloading during the night or dimly lit environments. In certain embodiments, fastener cup 36 may allow the head of fastener 34 to be recessed, such that tires 22 cannot be punctured by fastener 34.

As mentioned, the height of the fastener cup 36 may be nominally taller than height of configurable track assembly 30, such that the extra height of fastener cup 36 may allow for configurable track assembly 30 to be twisted or warped. Thus, configurable track assembly 30 may be substantially floating with the fastener cups 36 limiting the movement of configurable track assembly 30. This difference in height between fastener cup 36 and configurable track assembly 30 allows configurable track assembly 30 to be coupled to deck 16 of transport 12 by fasteners 34 even if deck 16 is corrugated and/or has uneven angularities and heights. This difference in height may allow for configurable track assembly 30 to move up or down at least by this height difference and up to the height of fastener cup 36 to stay coupled to deck 16 even if deck 16 has an uneven surface at different locations below configurable track assembly 30. In certain embodiments, fastener cup 36 may be taller than configurable track assembly 32 by one-eighth of an inch.

FIG. 3A illustrates a top perspective view of configurable track assembly 30 used in vehicle restraint system 10 in accordance with a particular embodiment, and FIG. 3B illustrates a side perspective view of configurable track assembly 30 used in vehicle restraint system 10 in accordance with a particular embodiment. As mentioned, in certain embodiments, configurable track assembly 30 may be seven-eighth's of an inch high. In certain embodiments, each section of configurable track assembly 30 may be fifty-five inches long. In certain embodiments, each section of configurable track assembly 30 may have seven track holes 32 across. Sections of configurable track assembly 30 may have a nominal gap between their ends for water and debris management, such that debris can be blown out from underneath configurable track assembly 30. In certain embodiments, the gap between sections of configurable track assembly 30 may be one-half of an inch. In certain embodiments, sections of configurable track assembly 30 may be ramped downward to prevent damage to tires 22 of vehicle 20.

FIG. 4A illustrates a perspective view of winch assembly 80 in vehicle restraint system in accordance with a particular embodiment, and FIG. 4B illustrates hook 81 used to couple winch assembly 80 to configurable track assembly 30 in accordance with a particular embodiment. Referring to FIGS. 4A and 4B, winch assembly 80 may be a standard hand ratchet winch and may be made from steel or aluminum. In certain embodiments, winch assembly 80 may have the ratchet pawls reversed so that a downward force is used to tighten strap assembly 40. Winch assembly 80 is operable to tighten strap assembly 40, such that tires 22 of vehicle 20 are restrained properly to reduce the risk of movement of vehicle 20 from a sudden movement or force. In certain embodiments, winch assembly 80 may be hand operated. In certain embodiments, winch assembly 80 may be operated with a wrench. Winch assembly hook 81 may be in shape of a "J" and may used to couple winch assembly 700 to track hole 32. Hook 81 may be made from steel wire or forgings or castings of suitable strength and size.

FIG. 5A illustrates pin assembly 70 in vehicle restraint system 10 in accordance with a particular embodiment, and FIG. 5B illustrates hook 71 used to couple pin assembly 70 to configurable track assembly 30 in accordance with a particular embodiment. Pin assembly 500 may comprise a clevis 506 and idler pin 508. Pin assembly 500 may be coupled to track hole 32 by placing pin assembly hook 71 through a convenient track hole on outboard side of tire 22. Pin assembly hook 71 may be in shape of a "J". Hook 71 may be made from steel wire or forgings or castings of suitable strength and size.

FIG. 6A illustrates strap assembly 40 in vehicle restraint system 10 in accordance with a particular embodiment, and FIG. 6B illustrates hook 41 used to couple strap assembly 40 to configurable track assembly in accordance with a particular embodiment. Strap assembly 40 may also include cleats 44 made of rubber or other suitable material mounted on the strap, such that the cleats 44 provide more friction between tire 22 and strap assembly 40. One end of strap assembly 40 may be affixed to strap assembly hook 40, which may be coupled to track hole 32 by placing strap assembly hook 41 through a convenient track hole on inboard side of tire 22. Strap assembly hook 41 may be in shape of an "L". Hook 41 may be made from steel wire or forgings or castings of suitable strength and size.

FIG. 7 illustrates fastener cup 36 used in configurable track assembly 30 used in vehicle restraint system 10 in accordance with a particular embodiment. As mentioned, the diameter of the body 702 of fastener cup may be smaller than track hole 32, such that the clearance between the outside of the diameter of the fastener cup 36 and track hole 32 may allow for extra tolerance for the location of fasteners 34 drilled into deck 16. In certain embodiments, fastener cup 36 may be smaller than track hole 32 by one-eighth of an inch in diameter. Fastener cup 36 has a hole 704 in center of one end, which allows fastener 34 to pass through hole 704 and be secured by fastener cup 36. In certain embodiments, fastener cup 36 may have a counter bore, which allows the nose of a fastener gun, such as a huck gun, to fit into fastener cup 36. In certain embodiments, fastener cup 36 may have rim 706 that is nominally wider than the diameter of track hole 32, such that fastener cup 36 may be positioned in track hole 32. In certain embodiments, fastener cup 36 may allow the fastener head to be recessed, such that tires 22 cannot be punctured by fastener 34. In certain embodiments, fastener cup 36 may be made of steel.

As mentioned, the height of fastener cup 36 may be nominally taller than height of configurable track assembly 30, such that the extra height of fastener cup 36 may allow for configurable track assembly 30 to be twisted or warped. In certain embodiments, fastener cup 36 may be taller than configurable track assembly 30 by one-eighth of an inch. In certain embodiments, fastener cups 36 may be painted with a reflective paint, such as reflective white paint, to help guide vehicles 20 onto configurable track assembly 30 for loading and unloading during the night or dimly lit environments.

FIG. 8A illustrates fasteners 34 coupled to deck 16 and configurable track assembly 30 in accordance with a particular embodiment, and FIG. 8B illustrates configurable track assembly 30 coupled to deck 16 using fasteners 34 and fastener cups 36 in accordance with a particular embodiment. As mentioned, configurable track assembly 30 may also be configured to be coupled to deck 16 of transport 12 by fasteners 34 even if a deck 16 is corrugated with raised portions of deck 17 and depressed portions of deck 18. In certain embodiments, configurable track assembly 30 may be coupled to deck 16 by one or more fasteners 34, such as hucks, and one or more fastener cups 36, such as huck cups. In certain embodiments, one or more fasteners 34 are attached to deck 16. In certain embodiments, one or more fasteners 34 may be attached to deck using a very strong Huck® BOM fastener. In certain embodiments, one or more fasteners 34 may be attached to deck 16 using grade 8¼-20 bolts and nuts. One or more fasteners 34 may be attached to deck 16, such that one or more fasteners 34 are aligned with one or more track holes 32 of configurable track assembly 30. In certain embodiments, fasteners 34 are located in the recessed area of configurable track assembly 30, such that fasteners 34 do not protrude from the surface of configurable track assembly 30 and cannot puncture tire 22 of vehicle 20.

As mentioned, the flexibility of where fasteners 34 and fastener cups 36 are placed allow configurable track assembly 30 to be placed in numerous positions on deck 16. In certain embodiments, fasteners 34 and fastener cups 36 may be positioned on raised portions 17 on a corrugated deck 16, such as the second level deck in a railcar, and positioned away from the superstructure of transport 12 underneath deck 16, such as a railcar superstructure below the first level deck in a railcar. Sections of configurable track assembly 30 may have a nominal gap between their ends for water and debris management, such that debris can be blown out from underneath configurable track assembly 30. In certain embodiments, the gap between sections of configurable track assembly 30 may be one-half of an inch. Sections of configurable track assembly 30 do not have to be aligned to each other. In certain embodiments, sections of configurable track assembly 30 may be ramped downward to prevent damage to tires 22 of vehicle 20.

As mentioned, the diameter of the body of a fastener cup 36 may be smaller than track hole 32, such that the clearance between the outside of the diameter of the fastener cup 36 and the track hole 32 may allow for extra tolerance for the location of the fasteners 34 drilled into deck 16. In certain embodiments, fastener cup 36 may be smaller than track hole 32 by one-eighth of an inch in diameter. Fastener cup 36 has a hole in center of one end, which allows fastener 34 to pass through the hole and be secured by fastener cup 36. In certain embodiments, fastener cup 36 may have a counter bore, which allows the nose of a fastener gun, such as a huck gun, to fit into fastener cup. In certain embodiments, fastener cup may have a rim that is nominally wider than the diameter of track hole 32, such that fastener cup may be positioned in track hole 32. In certain embodiments, fastener cups 36 may be painted with a reflective paint, such as reflective white paint, to help guide vehicles 20 onto configurable track assembly 30 for loading and unloading during the night or dimly lit environments. In certain embodiments, fastener cup 36 may allow the head of fastener 34 to be recessed, such that tires 22 cannot be punctured by fastener 34.

As mentioned, the height of the fastener cup 36 may be nominally taller than height of configurable track assembly 30, such that the extra height of fastener cup 36 may allow for configurable track assembly 30 to be twisted or warped. Thus, configurable track assembly 30 may be substantially floating with the fastener cups 36 limiting the movement of configurable track assembly 30. This difference in height between fastener cup 36 and configurable track assembly 30 allows configurable track assembly 30 to be coupled to deck 16 of transport 12 by fasteners 34 even if deck 16 is corrugated and/or has uneven angularities and heights. This difference in height may allow for configurable track assembly 30 to move up or down at least by this height difference and up to the height of fastener cup 36 and stay coupled to deck 16 even if deck 16 has an uneven surface at different locations beneath configurable track assembly 30. In certain embodiments, fastener cup 36 may be taller than configurable track assembly 32 by one-eighth of an inch.

FIG. 9 illustrates configurable track assembly 30 coupled to deck 16 by hinge assemblies 900. As mentioned, vehicle restraint system 10 may include sections of configurable track assembly 30, which may be coupled to deck 16 with one or more hinge assemblies 900. Hinge assemblies 900 may be operable to unhinge a section of configurable track assembly 30 to clean debris from underneath that section of configurable track assembly 30.

As mentioned, four hinge assemblies 900 may be coupled to a section of configurable track assembly 30, such that each hinge assembly 900 is located on the siding of configurable track assembly 30 near each corner. Each hinge assembly 900 may include hinge pins 906 that may be unpinned. In certain embodiments, hinge pins 906 may be removable from hinge assembly. If all hinge assemblies 900 coupled to one side of section of configurable track assembly 30 are unpinned, then section of configurable track assembly 30 may be hinged towards the opposite side of the unpinned hinge assemblies 900, such that the recess under the section of configurable track assembly 30 is exposed and may be cleaned of debris. If all hinge assembles 900 coupled to section of configurable track assembly 30 are unpinned, then section of configurable track assembly 30 may be easily removed and another section of configurable track assembly 30 may be easily substituted.

As mentioned, all hinge assemblies 900 coupled to a section of configurable track assembly 30, this section of configurable track assembly 30 is secured to deck 16 because hinge assemblies 900 are coupled to this section. Hinge assembly 900 bears the stress of fore or aft and side to side loads, such that stress is not placed on hinge pin 906. Hinge pin 906 may only bear stress from up or down loads or when section of configurable track assembly 30 is hinged up. Hinge pin holes may be oversized for alignment with another hinge assembly 900 and deck 16.

As mentioned, in certain embodiments, hinge assemblies 900 may be installed so that fasteners are also recessed in body 902 of hinge assembly 900 so that tire 22 will not be punctured by fasteners. In certain embodiments, hinge assembly 900 may be welded or cast into the side section of configurable track assembly 30. In certain embodiments, hinge assembly 900 may be attached to the side section of configurable track assembly 30 with a fastener. Hinge handle 907 may be operable to assist operator in hinging up or replacing the section of configurable track assembly 30. In certain embodiments, hinge clevis 904 may be attached to fastener located in the recess under configurable track assembly 30.

Modifications, additions, or omissions may be made to embodiments and components of the vehicle restraint system without departing from its intended scope. As one example, the method and means for coupling configurable track assembly to deck may be modified. Additionally, while certain embodiments and components of a vehicle restraint system have been described in detail numerous changes, substitutions, variations, alterations and modifications may be ascertained by those skilled in the art. It is intended that the present disclosure encompass all such changes, substitutions, variations, alterations and modifications as falling within the spirit and scope of the appended claims.

What is claimed is:

1. A vehicle restraint system, comprising:
a strap assembly, the strap assembly configured to be positioned on a portion of a tire of a vehicle to secure the vehicle to a configurable track assembly and a first end portion of the strap assembly configured to be coupled to the configurable track assembly on an inboard side of the tire of the vehicle;
a pin assembly configured to be coupled to the configurable track assembly on an outboard side of the tire of the vehicle, the pin assembly operable to receive the strap assembly;
a winch assembly configured to be coupled to the configurable track assembly on the outboard side of the tire of the vehicle and to a second end portion of the strap assembly, the winch assembly uncoupled from the pin assembly and operable to tighten the strap assembly around the portion of the tire; and
the configurable track assembly, wherein the configurable track assembly is coupled to a deck of a transport with a plurality of fasteners and fastener cups.

2. The system of claim 1, wherein the winch assembly is positioned outside an envelope of the vehicle.

3. The system of claim 1, wherein the strap assembly comprises cleats, the cleats being positioned in one or more grooves of tread of the tire.

4. The system of claim 1, wherein the pin assembly is coupled to the configurable track assembly by a hook placed through a hole in the configurable track assembly.

5. The system of claim 1 further comprising a sleeve threaded through the pin assembly, the sleeve operable to receive the strap assembly.

6. The system of claim 1, wherein the winch assembly is configured to be operated by hand to tighten the strap assembly around a portion of the tire.

7. The system of claim 1, wherein the transport is a railcar, and wherein the deck comprises an uneven surface.

8. The system of claim 1, wherein the configurable track assembly comprises a plurality of sections coupled to the deck of the transport, at least one of the plurality of sections being operable to be removed and replaced by another section without drilling a hole.

9. A method for restraining a vehicle, comprising:
   positioning a strap assembly on a portion of a tire of a vehicle to secure the vehicle to a configurable track assembly;
   coupling a first end portion of the strap assembly to the configurable track assembly on an inboard side of the tire of the vehicle;
   coupling a pin assembly to the configurable track assembly on an outboard side of the tire of the vehicle, the pin assembly operable to receive the strap assembly;
   coupling a winch assembly to a second end portion of the strap assembly;
   coupling the winch assembly to the configurable track assembly on the outboard side of the tire of the vehicle, the winch assembly uncoupled from the pin assembly and operable to tighten the strap assembly around the portion of the tire
   providing the configurable track assembly; and
   coupling the configurable track assembly to a deck of a transport with a plurality of fasteners and fastener cups.

10. The method of claim 9, wherein the winch assembly is positioned outside an envelope of the vehicle.

11. The method of claim 9, wherein the pin assembly is coupled to the configurable track assembly by a hook placed through a hole in the configurable track assembly.

12. The method of claim 9, further comprising operating the winch assembly by hand to tighten the strap assembly around a portion of the tire.

13. The method of claim 9, wherein the deck is a bi-level deck and the transport is a railcar.

14. The method of claim 9, wherein the transport is a railcar, and wherein the deck comprises an uneven surface.

15. A method for restraining a vehicle, comprising:
   positioning a strap assembly on a portion of a tire of a vehicle to secure the vehicle to a configurable track assembly;
   coupling a first end portion of the strap assembly to the configurable track assembly on an inboard side of the tire of the vehicle;
   coupling a pin assembly to the configurable track assembly on an outboard side of the tire of the vehicle, the pin assembly operable to receive the strap assembly;
   coupling a winch assembly to a second end portion of the strap assembly; and
   coupling the winch assembly to the configurable track assembly on the outboard side of the tire of the vehicle, the winch assembly uncoupled from the pin assembly and operable to tighten the strap assembly around the portion of the tire;
      providing a plurality of sections of the configurable track assembly;
      coupling the plurality of sections to a deck of a transport;
      removing one of the plurality of sections; and
      replacing the one of the plurality of sections with another section without drilling a hole.

16. The method of claim 15, wherein the winch assembly is positioned outside an envelope of the vehicle.

17. The method of claim 15, wherein the pin assembly is coupled to the configurable track assembly by a hook placed through a hole in the configurable track assembly.

18. The method of claim 15, further comprising operating the winch assembly by hand to tighten the strap assembly around a portion of the tire.

19. The method of claim 15, wherein the deck is a bi-level deck and the transport is a railcar.

20. The method of claim 15, wherein the transport is a railcar, and wherein the deck comprises an uneven surface.

21. The method of claim 15, further comprising coupling the plurality of sections of the configurable track assembly to the deck of the transport with a plurality of hinge assemblies.

\* \* \* \* \*